(12) United States Patent
Tanaka (10) Patent No.: US 12,422,668 B2
(45) Date of Patent: Sep. 23, 2025

(54) LIGHT SCANNING DEVICE

(71) Applicant: FUJIFILM Corporation, Tokyo (JP)

(72) Inventor: Nobuya Tanaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 428 days.

(21) Appl. No.: 18/064,526

(22) Filed: Dec. 12, 2022

(65) Prior Publication Data

US 2023/0185082 A1    Jun. 15, 2023

(30) Foreign Application Priority Data

Dec. 14, 2021 (JP) ................................ 2021-202877

(51) Int. Cl.
| | | |
|---|---|---|
| *G02B 26/08* | (2006.01) | |
| *G02B 26/10* | (2006.01) | |
| *G02B 26/12* | (2006.01) | |

(52) U.S. Cl.
CPC ......... *G02B 26/101* (2013.01); *G02B 26/126* (2013.01)

(58) Field of Classification Search
CPC .............. G02B 26/101; G02B 26/126; G02B 27/0081; G02B 27/0172; G02B 2027/013; G02B 2027/0194; G02B 26/0858; G02B 2027/0178; G02B 27/017; G02B 26/105
See application file for complete search history.

(56) References Cited

U.S. PATENT DOCUMENTS

| | | | |
|---|---|---|---|
| 2015/0036221 A1* | 2/2015 | Stephenson ........ | G02B 27/0101 359/630 |
| 2018/0299680 A1 | 10/2018 | Alexander et al. | |
| 2019/0310543 A1 | 10/2019 | Komatsu et al. | |
| 2021/0173199 A1* | 6/2021 | Suzuki ................. | G02B 26/101 |

FOREIGN PATENT DOCUMENTS

| | | |
|---|---|---|
| WO | WO 2014/045340 A1 | 3/2014 |
| WO | WO 2014/180509 A1 | 11/2014 |

OTHER PUBLICATIONS

Jang et al., "Retinal 3D: Augmented Reality Near-Eye Display via Pupil-Tracked Light Field Projection on Retina", ACM Transactions on Graphics, Nov. 2017, vol. 36, No. 6, Article 190, total 13 pages, <URL:http://library.usc.edu.ph/ACM/TOG%2036/content/papers/190-0330-jang.pdf>.
Extended European Search Report for corresponding European Application No. 22212179.0, dated May 23, 2023.

* cited by examiner

*Primary Examiner* — Euncha P Cherry
(74) *Attorney, Agent, or Firm* — Birch, Stewart, Kolasch & Birch, LLP (57) ABSTRACT

A light scanning device includes a light source that emits laser light, a mirror device that includes a movable mirror swinging about at least one axis and directionally changes the laser light emitted from the light source by reflecting the laser light using the movable mirror, and a condensing optical system that condenses the laser light directionally changed by the mirror device. The condensing optical system includes a half-silvered mirror that has a concave surface, and a diffusion plate in which a plurality of micromirrors that diffuse the laser light transmitted through the half-silvered mirror from the concave surface side are formed.

6 Claims, 9 Drawing Sheets

LIGHT SCANNING DEVICE

CROSS-REFERENCE TO RELATED APPLICATIONS

The present application claims priority under 35 U.S.C. § 119 to Japanese Patent Application No. 2021-202877 filed on Dec. 14, 2021. The above application is hereby expressly incorporated by reference, in its entirety, into the present application.

BACKGROUND

1. Technical Field

The disclosed technology relates to a light scanning device.

2. Description of the Related Art

In recent years, augmented reality (AR) glasses that display a virtual image, various information, and the like in a superimposed manner on an actual view have been in practical use. The AR glasses are also referred to as smart glasses, a head mounted display (HMD), AR eyeglasses, and the like.

Some AR glasses employ a method of directly scanning laser light emitted from a light source to retinas of eyes of a user by directionally changing the laser light using a movable mirror (also referred to as a micro electro mechanical systems (MEMS) mirror) configured with MEMS. This method is referred to as a retinal scanning method. In the AR glasses of the retinal scanning method, the laser light directionally changed by the movable mirror is condensed to pupils of the eyes of the user by a condensing optical system and is scanned to the retinas. Since the retinal scanning method does not depend on a focus adjustment function of crystalline lenses of the eyes, the user can clearly see a video projected to the retinas even in a case where the user is nearsighted or farsighted or has presbyopia. In addition, the AR glasses of the retinal scanning method have high energy efficiency and thus, can be driven for a long time period.

On the other hand, the AR glasses of the retinal scanning method have a problem in that the video is not seen in a case where a condensing point of the laser light by the condensing optical system does not match positions of the pupils. That is, the video is not seen in a case where the positions of the pupils deviate from the condensing point because the user moves the eyes. This problem is known as a narrow movable range of the eyes for clearly seeing the video, that is, a narrow eyebox.

Accordingly, an objective for the AR glasses of the retinal scanning method is to expand the eyebox. US2018/0299680A discloses a technology for expanding an eyebox by replicating laser light directionally changed by a movable mirror using a prism or a light guide plate. In addition, Changwon Jang, Kiseung Bang, Seokil Moon, Jonghyun Kim, Seungjae Lee, and Byoungho Lee. 2017. Retinal 3D: augmented reality near-eye display via pupil-tracked light field projection on retina. ACM Trans. Graph. 36, 6, Article 190 (November 2017). Retrieved from the Internet: <URL: http://library.usc.edu.ph/ACM/TOG%2036/content/papers/190-0330-jang.pdf> discloses a technology for expanding an eyebox by condensing laser light to positions of pupils using a mirror while tracking the positions of the pupils using eye tracking.

SUMMARY

However, the technologies disclosed in US2018/0299680A and Changwon Jang, Kiseung Bang, Seokil Moon, Jonghyun Kim, Seungjae Lee, and Byoungho Lee. 2017. Retinal 3D: augmented reality near-eye display via pupil-tracked light field projection on retina. ACM Trans. Graph. 36, 6, Article 190 (November 2017). Retrieved from the Internet: <URL: http://library.usc.edu.ph/ACM/TOG%2036/content/papers/190-0330-jang.pdf> have a complicated configuration for expanding the eyebox. Thus, a technology that can expand the eyebox with a simple configuration is desired. Furthermore, a technology that can expand the eyebox and also expand an angle of view is desired.

An object of the disclosed technology is to provide a light scanning device that can expand an eyebox and expand an angle of view with a simple configuration.

In order to accomplish the above object, a light scanning device according to an aspect of the present disclosure comprises a light source that emits laser light, a mirror device that includes a movable mirror swinging about at least one axis and directionally changes the laser light emitted from the light source by reflecting the laser light using the movable mirror, and a condensing optical system that condenses the laser light directionally changed by the mirror device, in which the condensing optical system includes a half-silvered mirror that has a concave surface, and a diffusion plate in which a plurality of micromirrors that diffuse the laser light transmitted through the half-silvered mirror from the concave surface side are formed.

It is preferable that the condensing optical system condenses the laser light directionally changed by the mirror device to a center of an eyeball.

It is preferable that the concave surface is an elliptical surface, and a swinging axis of the movable mirror is positioned at one focal point of the elliptical surface, and the center of the eyeball is positioned at the other focal point of the elliptical surface.

It is preferable that the diffusion plate diffuses the laser light transmitted through the half-silvered mirror from the concave surface side in a direction other than a specular reflection direction.

It is preferable that the half-silvered mirror and the diffusion plate are formed of a material having the same refractive index.

It is preferable that the movable mirror is configured to be swingable about a first axis and a second axis that are orthogonal to each other.

According to the disclosed technology, a light scanning device that can expand an eyebox and expand an angle of view with a simple configuration can be provided.

BRIEF DESCRIPTION OF THE DRAWINGS

Exemplary embodiments according to the technique of the present disclosure will be described in detail based on the following figures, wherein.

DETAILED DESCRIPTION

Hereinafter, an embodiment according to the disclosed technology will be described in detail with reference to the drawings. As an example, a form of applying a light scanning device according to the embodiment of the disclosed technology to AR glasses will be described in the embodiment below.

Figure 1:
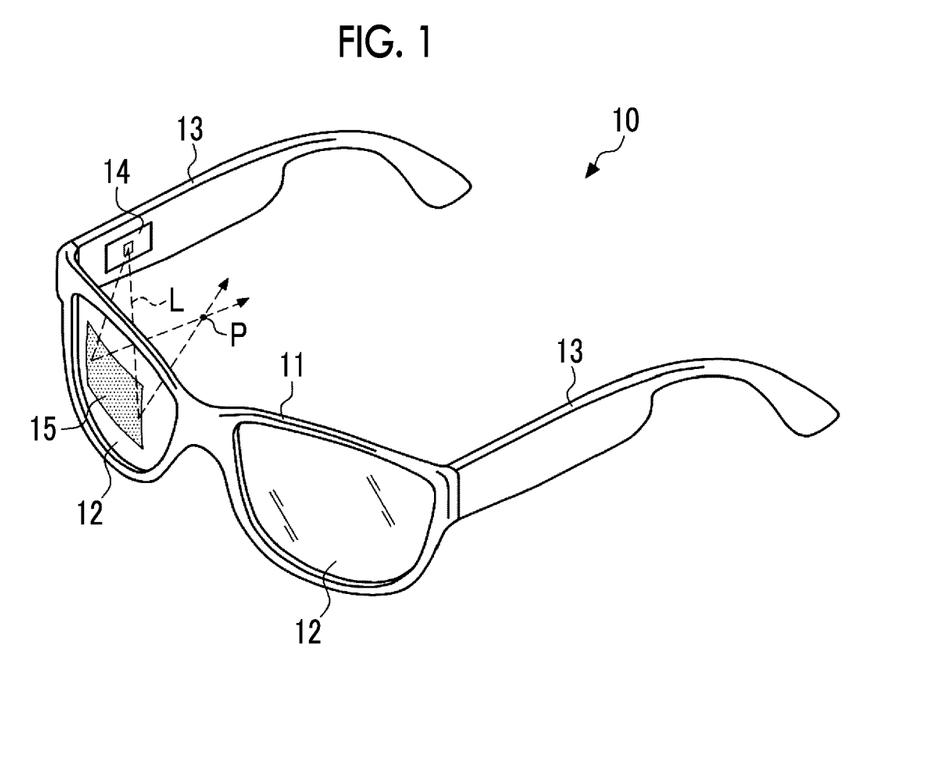
FIG. 1 is a schematic diagram illustrating an example of a configuration of AR glasses.

FIG. 1 illustrates a configuration of AR glasses 10 according to the present embodiment. As illustrated in FIG. 1, the AR glasses 10 are configured with a frame 11, two lenses 12, two temples 13, a module 14, and a condensing optical system 15. The two lenses 12 are held in the frame 11. Each of the two temples 13 is connected to an end part of the frame 11 through a hinge (not illustrated).

The module 14 is provided in one of the two temples 13. In addition, the condensing optical system 15 is provided in the lens 12 on a temple 13 side in which the module 14 is provided out of the two lenses 12. In the present embodiment, the module 14 is provided in the temple 13 on a right eye side, and the condensing optical system 15 is provided in the lens 12 on the right eye side. The module 14 may be provided in both of the two temples 13, and the condensing optical system 15 may be provided in both of the two lenses 12.

The module 14 emits laser light L modulated in accordance with an image signal toward the condensing optical system 15. The condensing optical system 15 reflects and condenses a part of the laser light L incident from the module 14 to a center of an eyeball of a user wearing the AR glasses 10. Reference numeral P denotes a condensing point of the laser light L by the condensing optical system 15. As will be described in detail later, the condensing optical system 15 is configured to reflect a part of the laser light L incident from the module 14 and diffuse a part of the laser light L.

Figure 2:
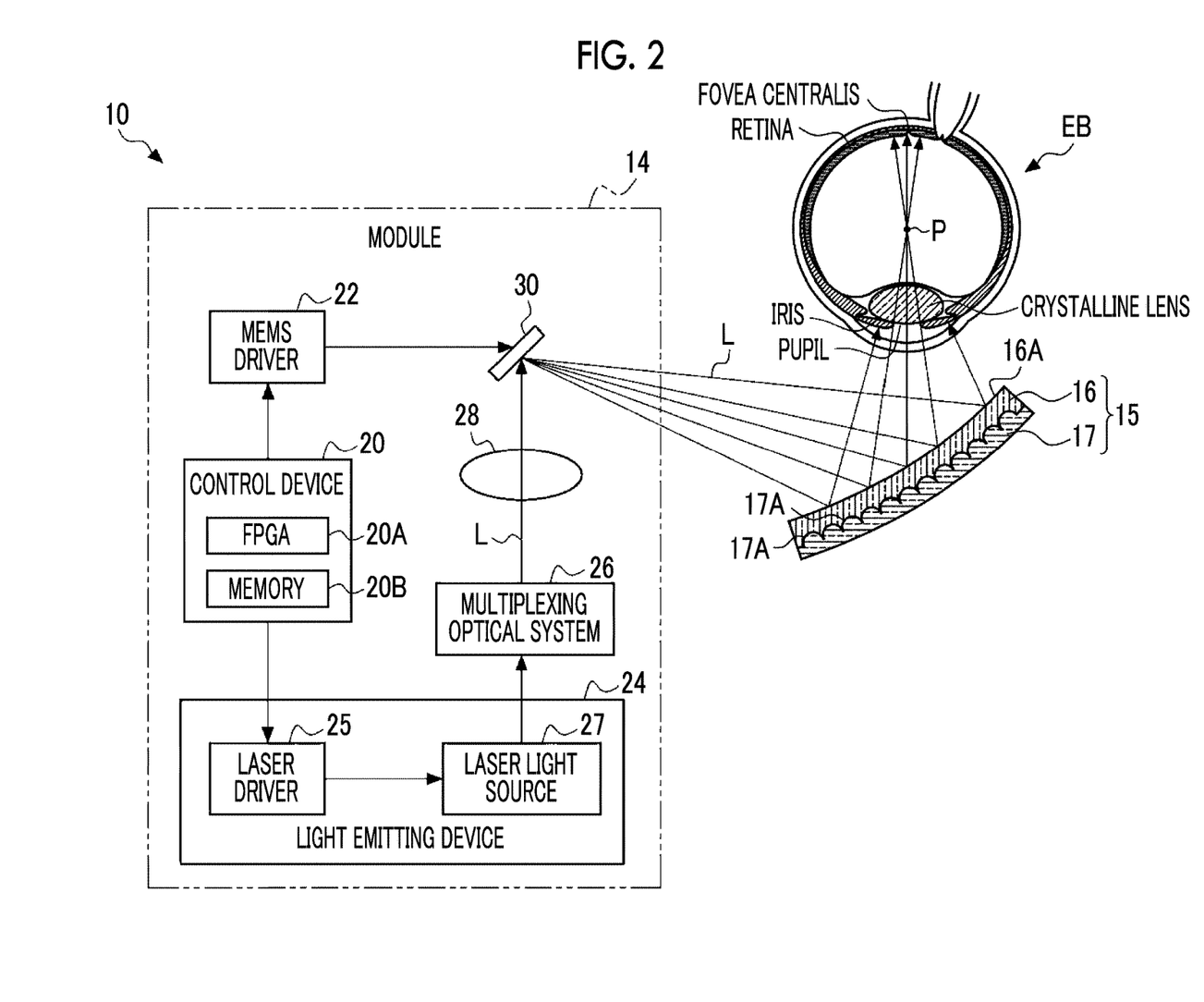
FIG. 2 is a diagram illustrating an example of configurations of a module and a condensing optical system.

FIG. 2 illustrates configurations of the module 14 and the condensing optical system 15. As illustrated in FIG. 2, the module 14 comprises a control device 20, a micro electro mechanical systems (MEMS) driver 22, a light emitting device 24, a multiplexing optical system 26, a collimator 28, and a MEMS mirror 30. The MEMS mirror 30 is an example of a "mirror device" according to the embodiment of the disclosed technology.

The light emitting device 24 includes a laser driver 25 and a laser light source 27. The laser driver 25 of the present embodiment drives the laser light source 27 based on an intensity modulation signal supplied from the control device 20 and causes the laser light L for forming an image to be output from the laser light source 27. For example, the laser light source 27 outputs the laser light L of three colors of red (R), green (G), and blue (B). The laser light source 27 is an example of "light source" according to the embodiment of the disclosed technology.

The laser light L output from the laser light source 27 is multiplexed by the multiplexing optical system 26. Then, the MEMS mirror 30 is irradiated with the multiplexed laser light L through the collimator 28. The laser light L with which the MEMS mirror 30 is irradiated is reflected toward the condensing optical system 15 by the MEMS mirror 30.

The MEMS driver 22 drives the MEMS mirror 30 under control of the control device 20. In the MEMS mirror 30, a mirror portion 40 (refer to FIG. 3) that reflects the laser light L independently swings about each of two axes orthogonal to each other as a central axis. In the present embodiment, the laser light L is scanned in a state of drawing a Lissajous curve on the condensing optical system 15 by the swing of the mirror portion 40 based on a driving signal. The Lissajous curve is a curve that is decided by a swing frequency about a first axis, a swing frequency about a second axis, and a phase difference therebetween. The mirror portion 40 is an example of a "movable mirror" according to the embodiment of the disclosed technology. The MEMS mirror 30 directionally changes the laser light L by reflecting the laser light L using the mirror portion 40. Directional changing refers to changing a traveling direction of the laser light L.

The control device 20 of the present embodiment includes a field programmable gate array (FPGA) 20A and a memory 20B. For example, the memory 20B is a volatile memory and stores various information such as the image signal representing the image projected to the condensing optical system 15. For example, the memory 20B stores the image signal input from an outside of the AR glasses 10.

The condensing optical system 15 is composed of a half-silvered mirror 16 and a diffusion plate 17. The laser light L directionally changed by the MEMS mirror 30 is incident on the half-silvered mirror 16. The diffusion plate 17 is bonded to a surface of the half-silvered mirror 16 on an opposite side from a surface on which the laser light L is incident.

A concave surface 16A that specularly reflects a part of the laser light L incident from the MEMS mirror 30 is formed in the half-silvered mirror 16. The half-silvered mirror 16 specularly reflects a part of the laser light L and transmits a part of the laser light L. The laser light L transmitted through the half-silvered mirror 16 is incident on the diffusion plate 17. In FIG. 2, the laser light L transmitted through the half-silvered mirror 16 is not illustrated.

In the present embodiment, the concave surface 16A is an elliptical surface. More specifically, the concave surface 16A is a surface of a part of a rotational ellipsoid obtained by rotating an ellipse about an axis passing through two focal points of the ellipse as a center. That is, the concave surface 16A is an off-axis elliptical surface. Light output from one focal point always reaches the other focal point in a case where the light is specularly reflected by the concave surface 16A.

The AR glasses 10 are configured such that a swinging axis of the MEMS mirror 30 is positioned at one focal point of the concave surface 16A and a center of an eyeball EB of the user is positioned at the other focal point. Based on this geometrical relationship, a part of the laser light L incident on the condensing optical system 15 from the MEMS mirror 30 is reflected by the concave surface 16A of the half-silvered mirror 16 and is condensed to the center of the eyeball EB.

A plurality of micromirrors 17A that diffuse the laser light L transmitted through the half-silvered mirror 16 are formed in the diffusion plate 17. For example, each micromirror 17A has an approximately hemispherical shape and is arranged to have a convex shape toward the concave surface 16A of the half-silvered mirror 16. For example, the plurality of micromirrors 17A are in contact with a surface of the half-silvered mirror 16 on an opposite side from the concave surface 16A. In addition, the plurality of micromirrors 17A are arranged adjacent to each other in two dimensions.

For example, the half-silvered mirror 16 and the diffusion plate 17 are formed of a material such as resin or glass that transmits the laser light L. In addition, for example, the half-silvered mirror 16 and the diffusion plate 17 are formed of a material having the same refractive index. The diffusion plate 17 reflects a part of the laser light L transmitted through the half-silvered mirror 16 on surfaces (that is, an interface between the half-silvered mirror 16 and the diffusion plate 17) of the micromirrors 17A. The condensing optical system 15 has a light-transmitting property as a whole and transmits a part of external light incident from an outside toward the eyeball EB.

Each micromirror 17A diffuses the laser light L transmitted through the half-silvered mirror 16 in a specular reflection direction and a direction other than the specular reflection direction. The specular reflection direction is a reflection direction in a case where light is reflected in a direction equal to an incidence angle. Since each micromirror 17A also diffuses the laser light L in the direction other than the specular reflection direction, a part of the laser light L diffused by the micromirrors 17A passes through a pupil of the eyeball EB and is incident on a retina without passing through the condensing point P that is the center of the eyeball EB.

Figure 3:
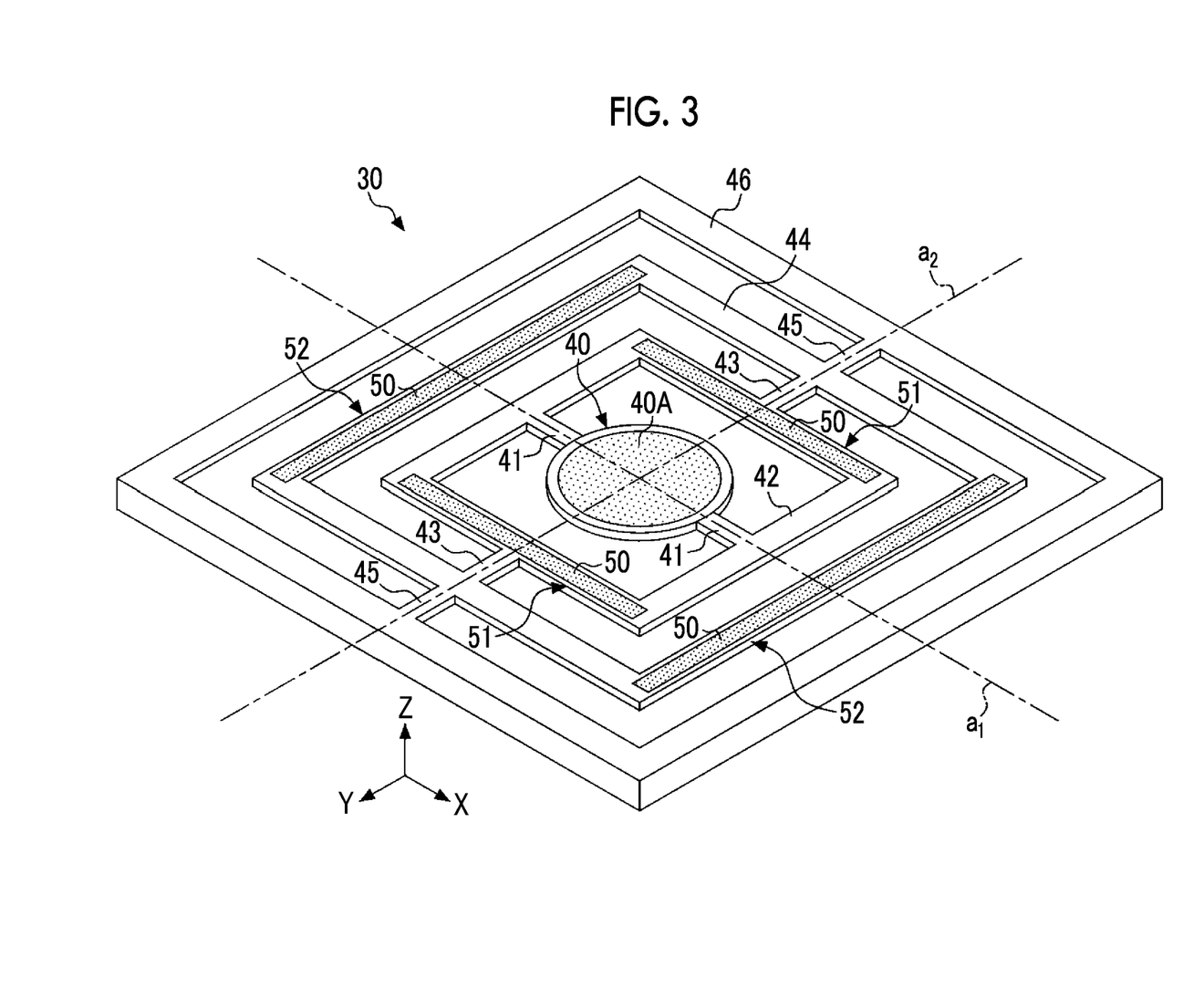
FIG. 3 is a schematic perspective view illustrating an example of a configuration of a MEMS mirror.

FIG. 3 illustrates an example of a configuration of the MEMS mirror 30. The MEMS mirror 30 includes the mirror portion 40, a first support portion 41, a first movable frame 42, a second support portion 43, a second movable frame 44, a connecting portion 45, and a fixed frame 46.

The mirror portion 40 has a reflecting surface 40A on which an incidence ray is reflected. For example, the reflecting surface 40A is formed with a thin metal film of gold (Au), aluminum (Al), silver (Ag), or a silver alloy. For example, a shape of the reflecting surface 40A is a circular shape.

The first support portion 41 is arranged outside the mirror portion 40 at each of positions that face with a second axis $a_2$ interposed therebetween. The first support portions 41 are connected to the mirror portion 40 on a first axis $a_1$ and support the mirror portion 40 in a swingable manner about the first axis $a_1$.

The first movable frame 42 is a rectangular frame surrounding the mirror portion 40 and is connected to the mirror portion 40 through the first support portions 41 on the first axis $a_1$. A piezoelectric element 50 is formed on the first movable frame 42 at each of positions that face with the first axis $a_1$ interposed therebetween. In such a manner, a pair of first actuators 51 are configured by forming two piezoelectric elements 50 on the first movable frame 42.

The pair of first actuators 51 are arranged at positions that face with the first axis $a_1$ interposed therebetween. The first actuators 51 cause the mirror portion 40 to swing about the first axis $a_1$ by applying rotational torque about the first axis $a_1$ to the mirror portion 40.

The second support portion 43 is arranged outside the first movable frame 42 at each of positions that face with the first axis $a_1$ interposed therebetween. The second support portions 43 are connected to the first movable frame 42 on the second axis $a_2$ and support the first movable frame 42 and the mirror portion 40 in a swingable manner about the second axis $a_2$. In the present embodiment, the second support portions 43 are torsion bars that stretch along the second axis $a_2$.

The second movable frame 44 is a rectangular frame surrounding the first movable frame 42 and is connected to the first movable frame 42 through the second support portions 43 on the second axis $a_2$. The piezoelectric element 50 is formed on the second movable frame 44 at each of positions that face with the second axis $a_2$ interposed therebetween. In such a manner, a pair of second actuators 52 are configured by forming two piezoelectric elements 50 on the second movable frame 44.

The pair of second actuators 52 are arranged at positions that face with the second axis $a_2$ interposed therebetween. The second actuators 52 cause the mirror portion 40 to swing about the second axis $a_2$ by applying rotational torque about the second axis $a_2$ to the mirror portion 40 and the first movable frame 42.

The connecting portion 45 is arranged outside the second movable frame 44 at each of positions that face with the first axis $a_1$ interposed therebetween. The connecting portions 45 are connected to the second movable frame 44 on the second axis $a_2$.

The fixed frame 46 is a rectangular frame surrounding the second movable frame 44 and is connected to the second movable frame 44 through the connecting portions 45 on the second axis $a_2$.

In the present embodiment, the first axis $a_1$ and the second axis $a_2$ are orthogonal to each other. In the following description, a direction parallel to the first axis $a_1$ will be referred to as an X direction, a direction parallel to the second axis $a_2$ will be referred to as a Y direction, and a direction orthogonal to the first axis $a_1$ and the second axis $a_2$ will be referred to as a Z direction.

Figure 4:
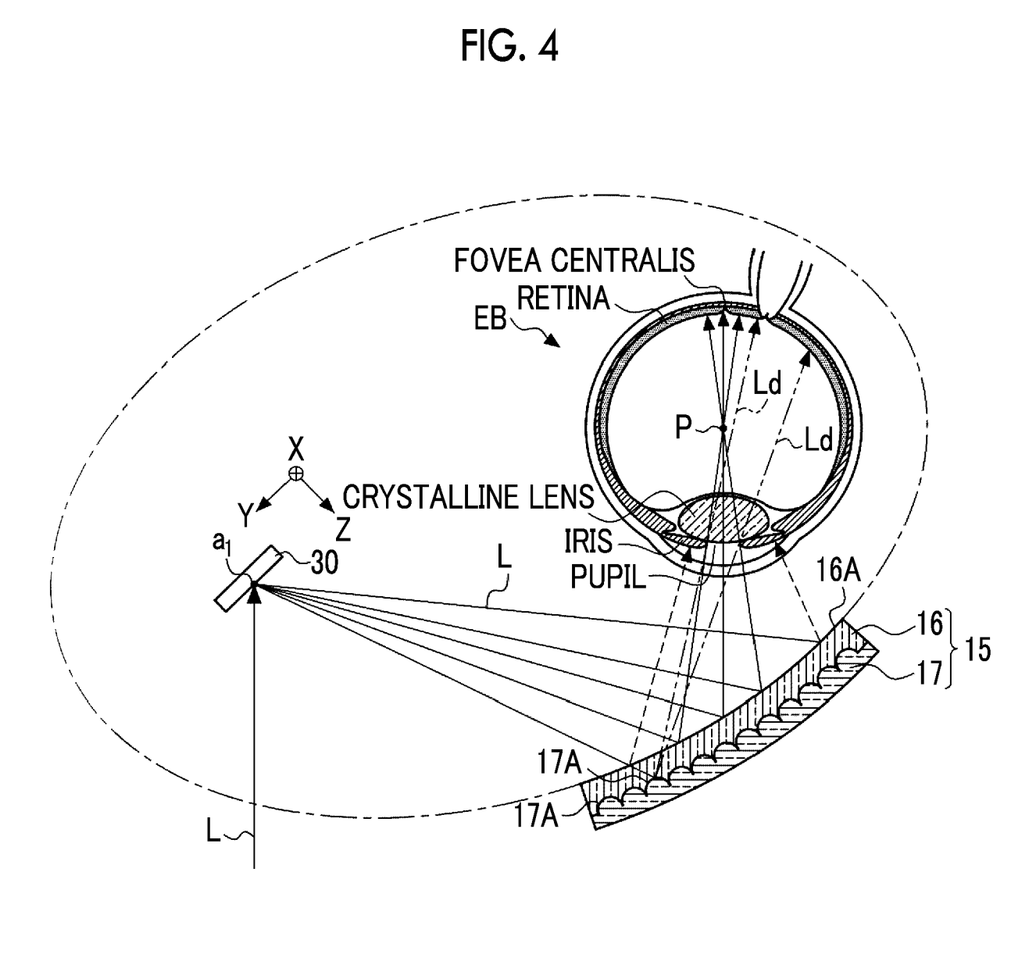
FIG. 4 is a diagram illustrating a positional relationship among the MEMS mirror, the condensing optical system, and an eyeball.

FIG. 4 illustrates a positional relationship among the MEMS mirror 30, the condensing optical system 15, and the eyeball EB. As illustrated in FIG. 4, the MEMS mirror 30 is arranged such that the first axis $a_1$ that is one swinging axis passes through one focal point of the concave surface 16A that is an elliptical surface. Specifically, the MEMS mirror 30 is arranged such that an intersection between the first axis $a_1$ and the second axis $a_2$ matches one focal point of the concave surface 16A that is an elliptical surface. Based on this geometrical relationship, a condensing point P of the laser light L reflected by the concave surface 16A matches the other focal point of the concave surface 16A.

The AR glasses 10 are configured such that the center of the eyeball EB matches the condensing point P in a case where the user wears the AR glasses 10. Thus, in a case where the user sees the concave surface 16A of the half-silvered mirror 16 in a state of wearing the AR glasses 10, a part of the laser light L reflected by the concave surface 16A is incident into the eyeball EB through the pupil and is condensed to the condensing point P and then, is incident on the retina. The laser light L incident into the eyeball EB is mainly incident on a region corresponding to a macula lutea including a fovea centralis in the retina. The fovea centralis is a part in which cells for recognizing colors and shapes are concentrated and has the highest resolution in the retina. The user recognizes a video based on the laser light L projected to the retina.

In the video projected to the concave surface 16A of the half-silvered mirror 16 by the MEMS mirror 30, the user can clearly recognize a part positioned at a center in a visual line direction.

While FIG. 4 illustrates a state where the concave surface 16A condenses the laser light L to the condensing point P in a YZ plane orthogonal to the first axis $a_1$, the concave surface 16A is not limited to the YZ plane and also condenses the laser light L to the condensing point P in a plane other than the YZ plane including the two focal points.

In FIG. 4, reference numeral Ld denotes a part of the laser light L (hereinafter referred to as diffused light Ld) that is transmitted through the half-silvered mirror 16 and diffused by the diffusion plate 17. As described above, the diffusion plate 17 diffuses the laser light L that is transmitted through the half-silvered mirror 16 and incident in the specular reflection direction and the direction other than the specular reflection direction by the micromirrors 17A. Thus, a part of the diffused light Ld is incident on the retina without passing through the condensing point P that is the center of the eyeball EB. That is, the diffused light Ld is also incident on a region other than a region on which the laser light L reflected by the concave surface 16A is incident in the retina.

Figure 5:
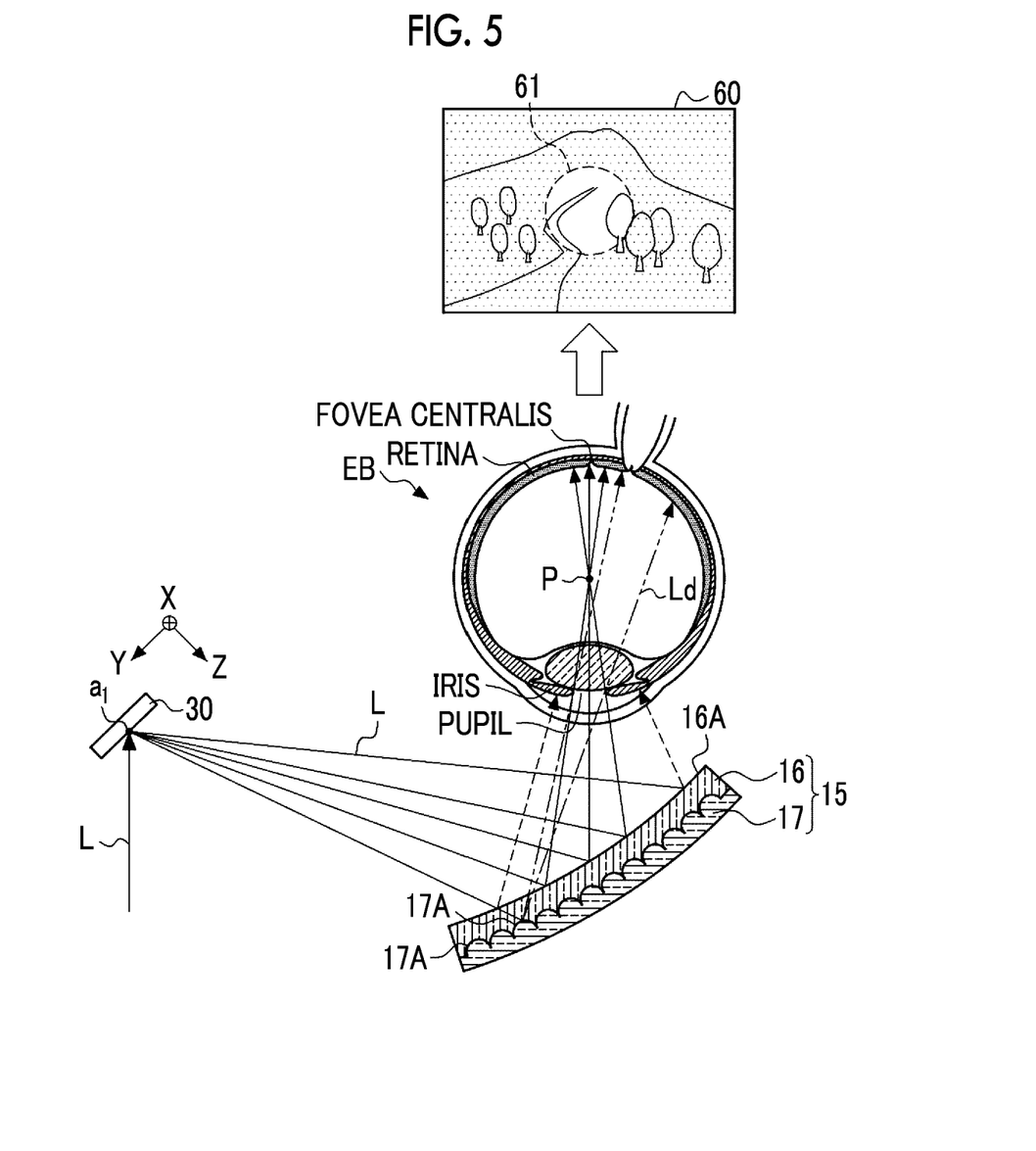
FIG. 5 is a diagram illustrating a state where a user sees the front.
Figure 6:
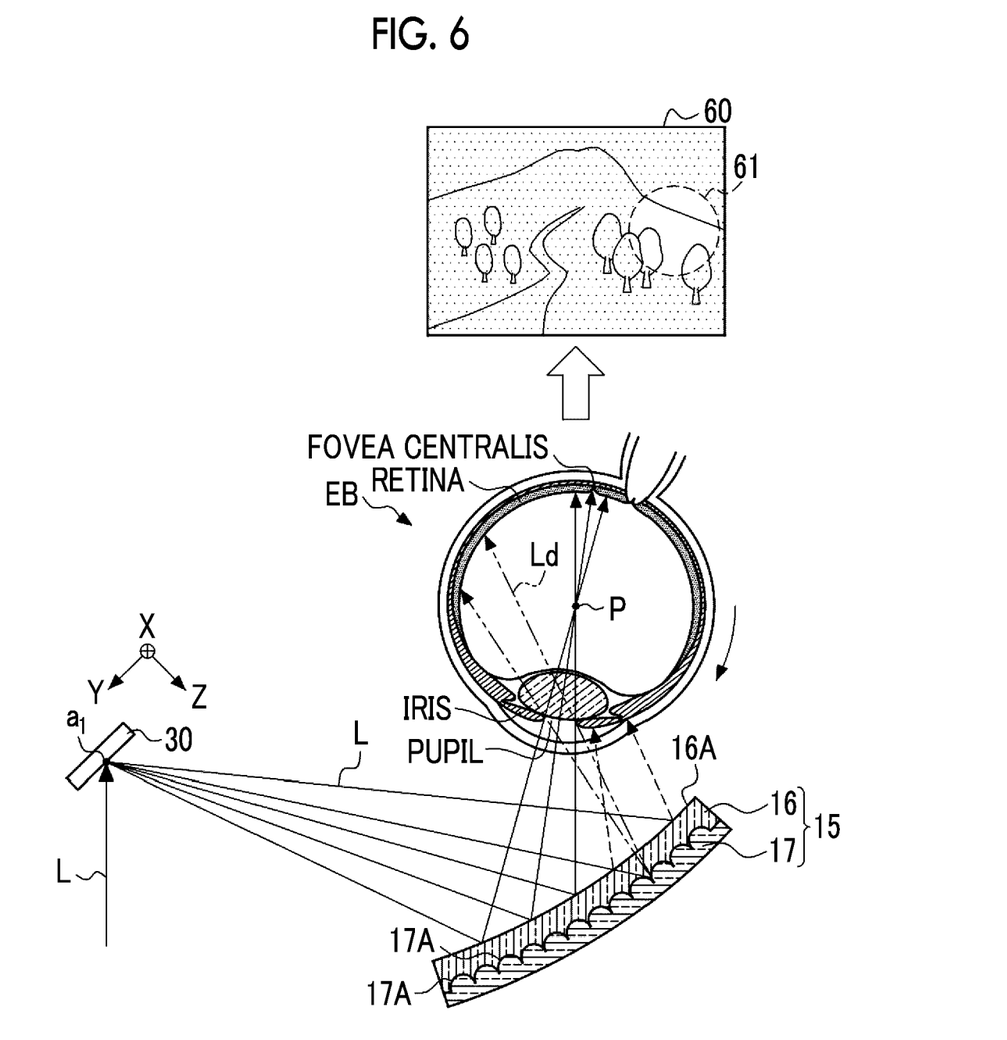
FIG. 6 is a diagram illustrating a state where the user moves a visual line to a right side from the front.
Figure 7:
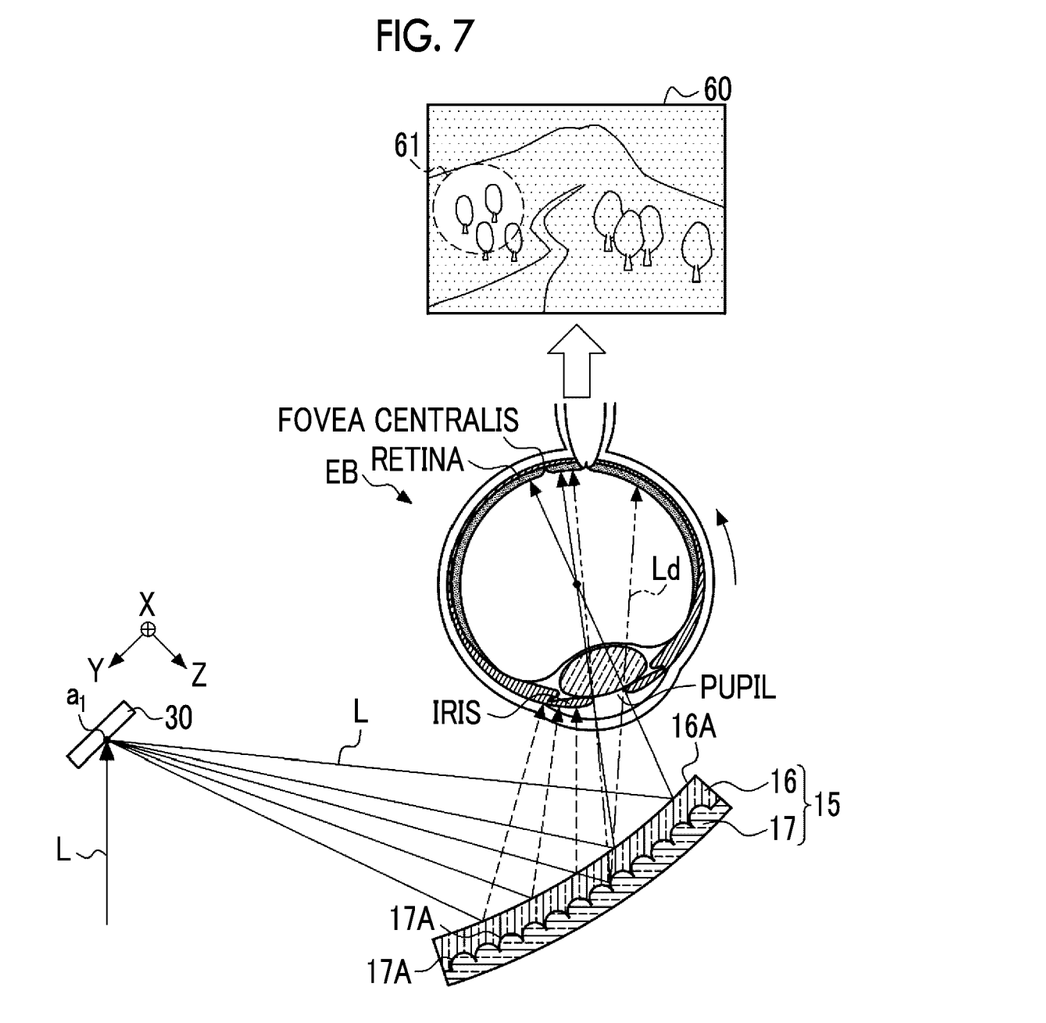
FIG. 7 is a diagram illustrating a state where the user moves the visual line to a left side from the front.

FIG. 5 to FIG. 7 are diagrams for describing expansion of an eyebox and expansion of an angle of view by the AR glasses 10 according to the present embodiment.

FIG. 5 illustrates a state where the user sees the front. In this case, the laser light L mainly related to the video at the center of the video projected to the concave surface 16A of the half-silvered mirror 16 is reflected by the concave surface 16A and is incident near the fovea centralis of the retina through the pupil. Reference numeral 60 denotes an image recognized by the user in a brain. Reference numeral 61 denotes a region (hereinafter, referred to as a high-definition region) that can be clearly recognized by the user in the entire image 60. The high-definition region 61 corresponds to a region near the fovea centralis of the retina. In FIG. 5, the high-definition region 61 is positioned at a center of the image 60.

FIG. 6 illustrates a state where the user moves a visual line to a right side from the front. In this case, the laser light L mainly related to the video on a right side of the video projected to the concave surface 16A of the half-silvered mirror 16 is incident near the fovea centralis of the retina through the pupil. In FIG. 6, the high-definition region 61 is positioned on a right side of the image 60.

FIG. 7 illustrates a state where the user moves the visual line to a left side from the front. In this case, the laser light L mainly related to the video on a left side of the video projected to the concave surface 16A of the half-silvered mirror 16 is incident near the fovea centralis of the retina through the pupil. In FIG. 7, the high-definition region 61 is positioned on a left side of the image 60.

As illustrated in FIG. 5 to FIG. 7, in the AR glasses 10 according to the present embodiment, since the laser light L reflected by the concave surface 16A of the half-silvered mirror 16 is condensed to the center of the eyeball EB, the laser light L of a region (corresponds to the high-definition region 61) on which the user focuses in the video projected to the concave surface 16A is always incident near the fovea centralis of the retina even in a case where a position of the pupil is moved because the user moves the visual line. In the embodiment of the disclosed technology, while the region that can be clearly recognized by the user in the video projected to the concave surface 16A of the half-silvered mirror 16 is slightly narrow, the region on which the user focuses can be always clearly recognized even in a case where the visual line is moved. That is, according to the embodiment of the disclosed technology, the eyebox can be expanded with a simple configuration.

In addition, the diffused light Ld is mainly incident on a region other than the region corresponding to the macula lutea including the fovea centralis in the retina. The diffused light Ld includes light generated by diffusion, by the diffusion plate 17, of the laser light L related to an edge part region other than the region on which the user focuses in the video projected to the concave surface 16A. Thus, in addition to the laser light L related to the video at the center of the video projected to the concave surface 16A, the laser light L related to the video in an edge part is incident on the retina as the diffused light Ld. Accordingly, while the video in the edge part of the region on which the user focuses has low resolution, the user can also recognize the video in the edge part. Thus, the angle of view is expanded.

In addition, as described above, by having the same refractive index for the half-silvered mirror 16 and the diffusion plate 17, refraction in the interface between the half-silvered mirror 16 and the diffusion plate 17 in a case where the external light is transmitted through the condensing optical system 15 from a diffusion plate 17 side is suppressed. By suppressing the refraction of the external light, the condensing optical system 15 enables the user to observe a view of an outer world without distortion together with the video based on the laser light L.

Figure 8:
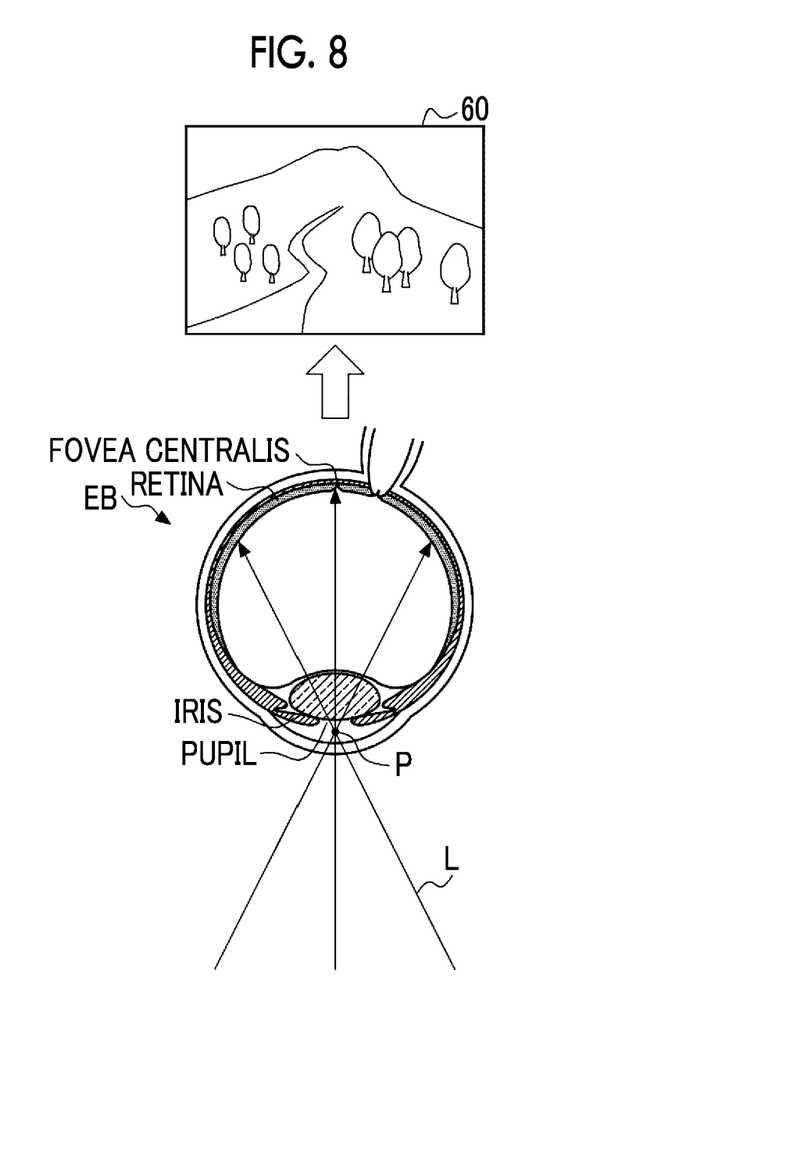
FIG. 8 is a diagram illustrating a state where the user sees the front in a retinal scanning method of the related art.

FIG. 8 is a diagram for describing a retinal scanning method of the related art. In the retinal scanning method of the related art, the laser light L is condensed near a center of the pupil and then, is incident on the retina. FIG. 8 illustrates a state where the user sees the front. In this case, since the condensing point P of the laser light L is positioned near the center of the pupil, an incidence angle of the laser light L incident on the retina is wide. That is, in the retinal scanning method of the related art, in a case where the user sees the front, the angle of view is wide, and the entire image 60 can be recognized. On the other hand, in the retinal scanning method of the related art, in a case where the user moves the visual line, the position of the pupil deviates from the condensing point P. Thus, there is a problem that the eyebox is narrow.

Figure 9:
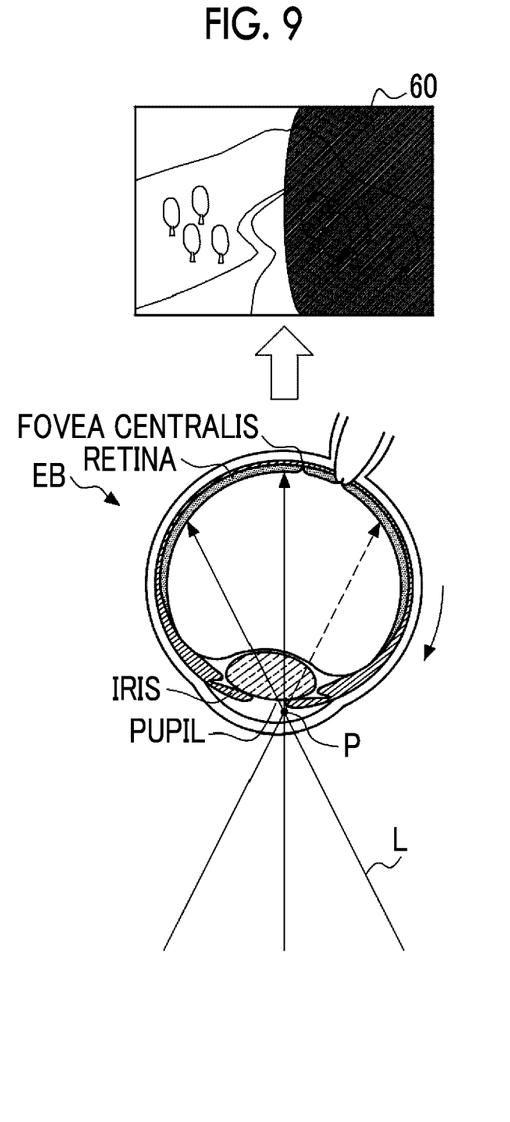
FIG. 9 is a diagram illustrating a state where the user moves the visual line to the right side from the front in the retinal scanning method of the related art.

FIG. 9 illustrates a state where the user moves the visual line to the right side from the front in the retinal scanning method of the related art. In this case, for example, the laser light incident from a right side of the pupil is blocked by an iris positioned on a left side of the pupil. Consequently, the video in a region on the right side of the image 60 is not seen. Since the video on the right side is not seen even in a case where the user moves the visual line to the right side in order to see the right side, the user feels stressed.

On the other hand, in a retinal scanning method according to the embodiment of the present disclosure, the laser light L is condensed to the center of the eyeball EB. Thus, even in a case where the position of the pupil is moved because the user moves the visual line, the user can always clearly recognize near a center of the visual line and does not feel stressed unlike in the related art. In the retinal scanning method according to the embodiment of the present disclosure, the resolution of the edge part region is low, and the edge part cannot be clearly recognized, compared to the retinal scanning method of the related art. However, generally, a person can only clearly recognize near a center of the visual field and needs to move eyes in accordance with a region of interest in a case of, for example, reading a text. Thus, as long as the user can always clearly recognize near the center of the visual line as in the retinal scanning method according to the embodiment of the present disclosure, there is no practical problem even in a case where the edge part region cannot be clearly recognized.

Modification Example

Next, various modification examples of the embodiment will be described. In the embodiment, while the diffusion plate 17 is configured to diffuse the laser light L that is transmitted through the half-silvered mirror 16 and incident in the specular reflection direction and the direction other than the specular reflection direction, the diffusion plate 17 may be configured to diffuse the laser light L in only the direction other than the specular reflection direction. For example, each micromirror 17A may have a shape in which the laser light L is diffused in only a direction outside an angular range of ±5° about the specular reflection direction as a center. By having such a configuration for the diffusion plate 17, the diffused light Ld is incident on only the edge part region of the retina without passing through the condensing point P that is the center of the eyeball EB. Thus, a decrease in resolution of the high-definition region 61 because of the incidence of the diffused light Ld is suppressed. Accordingly, a contrast of the image 60 is improved.

In addition, in the embodiment, while the diffusion plate 17 has the light-transmitting property, the diffusion plate 17 may have light reflectivity. For example, a light reflection film such as a metal film that highly reflects the laser light L is formed in the interface (that is, the surfaces of the micromirrors 17A) between the half-silvered mirror 16 and the diffusion plate 17. In addition, the diffusion plate 17 may be formed with a member of metal or the like having the light reflectivity. In a case where the diffusion plate 17 has the light reflectivity, the external light is not transmitted through the condensing optical system 15. Thus, a light scanning device that projects an immersive video can be configured.

In addition, the configuration of the MEMS mirror 30 illustrated in the embodiment can be appropriately changed. For example, in the embodiment, while the first actuator 51 and the second actuator 52 have a ring shape, one or both of the first actuator 51 and the second actuator 52 can have a meander structure. In addition, a support member having a configuration other than a torsion bar can be used as the first support portion 41 and the second support portion 43.

In addition, various modifications can be made to a hardware configuration of the control device 20. A processing unit of the control device 20 may be configured with one processor or may be configured with a combination of two or more processors of the same type or different types (for example, a combination of a plurality of field programmable gate arrays (FPGAs) and/or a combination of a CPU and an FPGA).

All documents, patent applications, and technical standards disclosed in the present specification are incorporated in the present specification by reference to the same extent as in a case where each of the documents, patent applications, technical standards are specifically and individually indicated to be incorporated by reference.

What is claimed is:

1. A light scanning device comprising:
a light source that emits laser light;
a mirror device that includes a movable mirror swinging about at least one axis and directionally changes the laser light emitted from the light source by reflecting the laser light using the movable mirror; and
a condensing optical system that condenses the laser light directionally changed by the mirror device,
wherein the condensing optical system includes
a half-silvered mirror that has a concave surface on which the laser light from the mirror device is incident, the half-silvered mirror being configured to specularly reflect a part of the laser light and transmit a part of the laser light, and
a diffusion plate that is disposed on an opposite side from the concave surface of the half-silvered mirror and in which a plurality of micromirrors that diffuse the laser light transmitted through the half-silvered mirror from the concave surface side are formed.

2. The light scanning device according to claim 1, wherein the condensing optical system condenses the laser light directionally changed by the mirror device to a center of an eyeball.

3. The light scanning device according to claim 2, wherein the concave surface is an elliptical surface, and a swinging axis of the movable mirror is positioned at one focal point of the elliptical surface, and the center of the eyeball is positioned at the other focal point of the elliptical surface.

4. The light scanning device according to claim 1, wherein the diffusion plate diffuses the laser light transmitted through the half-silvered mirror from the concave surface side in a direction other than a specular reflection direction.

5. The light scanning device according to claim 1, wherein the half-silvered mirror and the diffusion plate are formed of a material having the same refractive index.

6. The light scanning device according to claim 1, wherein the movable mirror is configured to be swingable about a first axis and a second axis that are orthogonal to each other.

* * * * *